US009933851B2

(12) United States Patent
Goslin et al.

(10) Patent No.: US 9,933,851 B2
(45) Date of Patent: Apr. 3, 2018

(54) SYSTEMS AND METHODS FOR INTERACTING WITH VIRTUAL OBJECTS USING SENSORY FEEDBACK

(71) Applicant: Disney Enterprises, Inc., Burbank, CA (US)

(72) Inventors: Michael P. Goslin, Sherman Oaks, CA (US); Eric C. Haseltine, Burbank, CA (US); Blade A. Olson, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/050,329

(22) Filed: Feb. 22, 2016

(65) Prior Publication Data

US 2017/0242483 A1    Aug. 24, 2017

(51) Int. Cl.
*G06F 3/033* (2013.01)
*G06F 3/01* (2006.01)

(52) U.S. Cl.
CPC ............. *G06F 3/016* (2013.01); *G06F 3/014* (2013.01); *G06F 3/017* (2013.01)

(58) Field of Classification Search
CPC ..... G06F 3/017; G06F 3/0482; G06F 3/04847
USPC .......................................... 345/156, 173, 174
See application file for complete search history.

(56) References Cited

U.S. PATENT DOCUMENTS

| 2013/0096575 | A1* | 4/2013 | Olson | G06T 19/003 606/130 |
| 2014/0267004 | A1* | 9/2014 | Brickner | G06F 3/017 345/156 |
| 2017/0052632 | A1* | 2/2017 | Kamamori | G06F 3/0416 |
| 2017/0090749 | A1* | 3/2017 | Marsden | G06F 3/04886 |

* cited by examiner

*Primary Examiner* — Calvin C Ma
(74) *Attorney, Agent, or Firm* — Farjami & Farjami LLP

(57) ABSTRACT

There is provided a system having a feedback device including a sensory feedback element, a non-transitory memory storing an executable code and a virtual object having a virtual surface, and a hardware processor. The hardware processor is configured to execute the executable code to determine a position of a hand of a first user, determine a location of the virtual surface of the virtual object, and transmit a first activation signal to the feedback device to cause a sensory feedback to be provided to the first user using the sensory feedback element of the feedback device based on the position of the hand of the first user relative to the location of the virtual surface of the virtual object.

18 Claims, 4 Drawing Sheets

SYSTEMS AND METHODS FOR INTERACTING WITH VIRTUAL OBJECTS USING SENSORY FEEDBACK

BACKGROUND

A user of a computer or game system may interact with virtual objects on a monitor or display of the computer or game system. Such interactions may typically involve the user directing a character or a tool to interact with a virtual object in some way, e.g. picking up the virtual object, moving the virtual object, climbing on or jumping over the virtual object, etc. Even in first-person video games, such as a real-time play environment or a first-person shooter game, a player's interaction is with a control device that provides input to the computer or game system. Recent advances in display technology and game consoles have allowed the creation of more realistic looking games, including realistic looking three-dimensional (3D) graphics. However, even with current advances in display technology, players still mostly feel as if they are merely observers, and not part of the events occurring in the game.

SUMMARY

The present disclosure is directed to systems and methods for interacting with virtual objects using sensory feedback, substantially as shown in and/or described in connection with at least one of the figures, as set forth more completely in the claims.

DETAILED DESCRIPTION

Figure 1:
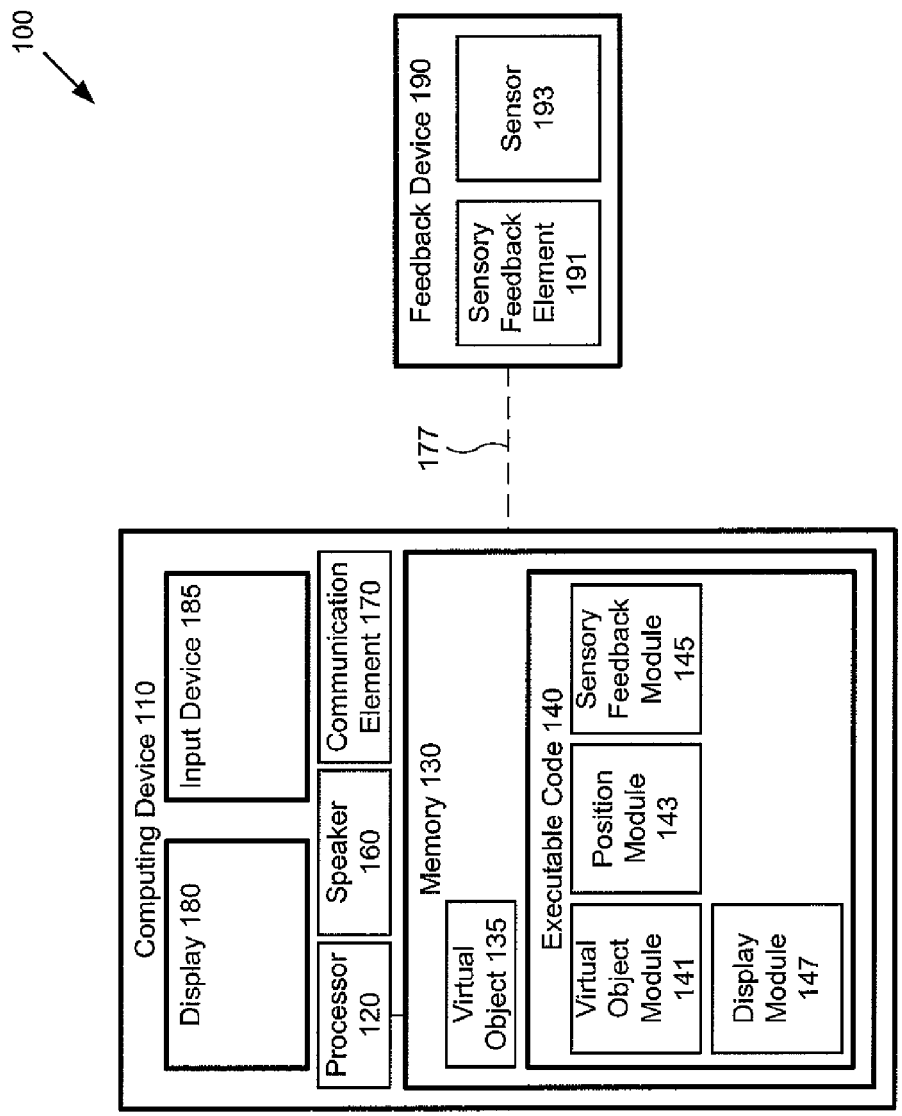
FIG. 1 shows a diagram of an exemplary system for interacting with virtual objects using sensory feedback, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for interacting with virtual objects using sensory feedback, according to one implementation of the present disclosure. System 100 includes computing device 110 connected to feedback device 190 by connection 177, which may be a wired connection or a wireless connection. Computing device 110 may be a computer, a tablet computer, a mobile phone, a video game console, a video game controller, an augmented reality system, etc. Computing device 110 includes processor 120, memory 130, speaker 160, communication element 170, display 180, and input device 185. Processor 120 is a hardware processor, such as a central processing unit (CPU) used in computing devices. Memory 130 is a non-transitory storage device for storing computer code for execution by processor 120, and also storing various data and parameters. Memory 130 includes virtual object 135 and executable code 140. Although feedback device 190 is shown as a separate device in FIG. 1, in some implementations, feedback device 190 may be included in computing device 110.

Virtual object 135 may be a virtual object stored in memory 130. In some implementations, virtual object 135 may be a virtual object stored in a virtual object database. For example, virtual object 135 may be one of a plurality of virtual objects stored in memory 130 that a user may use while playing a game, such as a virtual ball for use in a sports video game or a virtual weapon for use in an adventure video game. In other implementations, a user may create virtual object 135. For example, a user may create virtual object 135 for use in a video game such as a puzzle video game, a video game in which a first user attempts to identify a virtual object created or drawn by a second user, etc. Virtual object 135 may be a two-dimensional (2D) virtual object defined by a 2D boundary including a height and a width. In other implementations, virtual object 135 may include a three-dimensional (3D) boundary including a height, width, and depth.

In some implementations, virtual object 135 may represent a real object that is located at a different location than computing device 110. For example, computing device 110 may be connected to a computer network, such as the Internet. The user may be interacting with a second user located at a second location over the computer network, and virtual object 135 may be a virtual representation of an object at the location of the second user. In some implementations, virtual object 135 may be a virtual representation of the second user.

Executable code 140 includes one or more software modules stored in memory 130 for execution by processor 120 of commuting device 110. As shown in FIG. 1, executable code 140 includes virtual object module 141, position module 143, sensory feedback module 145, and display module 147. In some implementations, executable code 140 may be an app running on a mobile phone. Virtual object module 141 is a software module for execution by processor 120. Virtual object module 141 may determine a position of virtual object 135, an orientation of virtual object 135, an orientation of part or the entire virtual surface of virtual object 135, etc. In some implementations, virtual object module 141 may provide a virtual object stored in a database in memory 130, or virtual object module 141 may receive an input from a user to create virtual object 135. For example, the user may draw virtual object 135 using a computer or augmented reality device, such as by drawing virtual object 135 into the scene shown on the screen of a tablet computer, or the user may create virtual object 135, such as by using augmented reality input to build, paint, or otherwise create virtual object 135. Virtual object module 141 may determine a location of virtual object 135, such as a location in the area around computing device 110 and/or the user.

Position module 143 is a software module for execution by processor 120 to determine a location of one or more hands of one or more users. In some implementations, position module 143 may determine the position of the hand of the user relative to computing device 110. For example, when computing device is included in a headset, position module 143 may determine the position of the hands of the users relative to the headset. In other implementations, position module 143 may determine a location of one or more hand of one or more users in 3D space, such as a position in an area where the one or more users are using computing device 110. Position module 143 may track the position of the one or more hands of the one or more users, for example, by periodically sampling the position of the hand of the user relative to computing device 110 and/or in 3D space in the area around computing device 110 using input device 185. In some implementations, position module 143 may determine that the hand of the user is near the virtual surface of virtual object 135 and/or intersecting the virtual surface of virtual object 135.

Sensory feedback module 145 is a software module for execution by processor 120 to activate one or more sensory feedback elements, providing sensory feedback related to virtual object 135. In some implementations, sensory feedback module 145 may receive a signal from position module 143 when the hand of the user intersects the virtual surface of virtual object 135, when the hand of the user is within a proximity of the virtual surface of virtual object 135, such as within one half of one inch, one inch, two inches, etc., of the virtual surface of virtual object 135. In response to receiving the input signal from position module 143, sensory feedback module 145 may send an activation signal to feedback device 190 and/or feedback element 191. In some implementations, sensory feedback module 145 may send an activation signal to activate feedback element 191 in response to the hand of the user intersecting the virtual surface of virtual object 135. Sensory feedback module 145 may send an activation signal to activate feedback element 191 in response to the hand of the user coming within certain proximity of the virtual surface of virtual object 135.

In some implementations, sensory feedback module 145 may send a variable activation signal to activate feedback element 191. For example, sensory feedback module 145 may send a variable activation signal to activate sensory feedback element 191 when the hand of the user is within a certain proximity of the virtual surface of virtual object 135, such as within one inch, and increase the intensity of the activation signal as the hand of the user approaches the virtual surface of virtual object 135. In some implementations, the variable activation signal may change the intensity of the sensory feedback provided to the user by feedback element 191.

Sensory feedback module 145 may send an activation signal to activate a different sensory feedback when the hand of the user intersects the virtual surface of virtual object 135. For example, sensory feedback module 145 may transmit an initial activation signal when the hand of the user is within one inch of the virtual surface of virtual object 135, and may increase the activation signal as the hand of the user approaches the virtual surface of virtual object 135. When the hand of the user intersects the virtual surface of virtual object 135, sensory feedback module 145 may transmit an intersection signal indicating the intersection, such as a signal including a series of pulses to provide sensory feedback to the user that the user has virtually touched the virtual surface of virtual object 135.

In other implementations, sensory feedback module 145 may send an activation signal to display module 170 when the hand of the user intersects the virtual surface of virtual object 135. In response to the activation signal, display module 147 may show part or all of virtual object 135 on display 180. For example, when the hand of the user intersects a portion of the virtual surface of virtual object 135, the portion of the virtual surface of virtual object 135 may appear on display 180. As the user continues to explore virtual object 135, the virtual surface may be displayed on display 180. In some implementations, when display 180 includes an augmented reality display, the user may see virtual object 135 appear in a room as virtual object 135 is revealed in the augmented reality on display 180. In some implementations, the virtual surface of virtual object 135 may begin to appear on display 180 as the hand of the user approaches the virtual surface. For example, as the hand of the user moves within a distance of the virtual surface of virtual object 135, the virtual surface may appear as a transparent surface on display 180, and the virtual surface displayed may become less transparent as the hand of the user moves closer, so that the virtual surface of virtual object 135 is fully revealed as an opaque surface on display 180 when the hand of the user intersects the virtual surface of virtual object 135, until all of virtual object 135 is revealed on display 180.

Communication element 170 may be a communication element to connect computing device 110 to one or more other devices. In some implementations, communication element 170 may be configured to receive a communication cable such as a universal serial bus (USB) port, Firewire port, Ethernet cable port, telephone cable port, HDMI port, video game control port, etc. In some implementations, communications element 170 may be configured to receive a transferable memory device, such as an SD card, mini SD card, micro SD card, USB memory device (thumb drive), a memory stick, video game cartridge or disc, or other configurations of transferable memory known in the art. In some implementations, communication element 170 may enable wireless communications, such that computing device 110 may be wirelessly connected to a computer, a computer network, an input device such as a video game controller, and/or feedback device 190 using WiFi, cellular, Bluetooth®, Bluetooth® Low Energy (BLE), or other wireless technologies known in the art.

Display 180 may be a display for showing video content, such as a television, a computer display, a tablet computer display, a mobile phone display, an augmented reality display, etc. In some implementations, display 180 may show an augmented reality including the area surrounding the user, such as the room in which the user is using computing device 110, and virtual object 135. Input device 185 may be a device for determining the relative position of various objects in the area around the user and/or computing device 110, including the hand of the user. Input device 185 may include one or more cameras, such as one or more visible light cameras, infrared cameras, etc. In some implementations, input device 185 may include an infrared depth sensor, a LIDAR device, etc. In some implementations, input device 185 may use stereo cameras for depth determination. In some implementations, input device 185 may capture information about the area around computing device 110, such as an image of the room in which the user is using computing device 110.

Feedback device 190 may be a handheld device for providing feedback to a user or a wearable device for providing feedback to a user. Feedback device 190 may include an article of clothing, such as a vest, or an accessory, such as an armband, a necklace, a glove, etc. In some implementations, feedback device 190 may include sensory feedback element 191 and sensor 193. Sensory feedback element 191 may be integrated in feedback device 190, such as by integrating a physical feedback element, audio feedback element, or visual feedback element during manufacturing. Sensor 193 may be integrated in feedback device 190, such as by integrating a camera, infrared camera, or LIDAR device during manufacturing. In some implementations, feedback device 190 may be a mobile phone, and sensory feedback element 191 may be an element of the mobile phone, such as the speaker of the mobile phone, the display of the mobile phone, a motor or haptic actuator of the mobile phone, etc. Executable code 140 may activate sensory feedback element 191 to provide physical feedback, audio feedback, visual feedback, etc., to the user. Sensor 193 may be the camera, an accelerometer, a gyrometer, or other sensor element of the mobile phone.

In some implementations, sensory feedback element 191 may include a haptic actuator, a speaker, a display, or other device for providing feedback to the user. The haptic actuator may provide feedback to the user through touch a haptic effect such as vibration, motion, etc. Sensory feedback element 191 may include a motor for creating a vibration, one or more linear actuators for tapping, a speaker for generating physical feedback, such as by using low frequency sound to create a feeling of impact, etc. In some implementations, sensory feedback element 191 may be used to provide the user with sensor feedback when the hand of the user intersects the virtual surface of virtual object 135 and/or passes through a portion of virtual object 135. For example, sensory feedback element 191 may be used to provide physical feedback so the user feels the shaking effect when the hand of the user approaches and/or intersects the virtual surface of virtual object 135. In other implementations, sensory feedback element 191 may play an audible sound to alert the user when the hand of the user approaches and/or intersects the virtual surface of virtual object 135. Sensor 193 may be a sensor for collecting information about the position and/or orientation of feedback device 190 and/or the hand of the user. Sensor 193 may include an accelerometer, a gyrometer, a magnetometer, etc.

Figure 2:
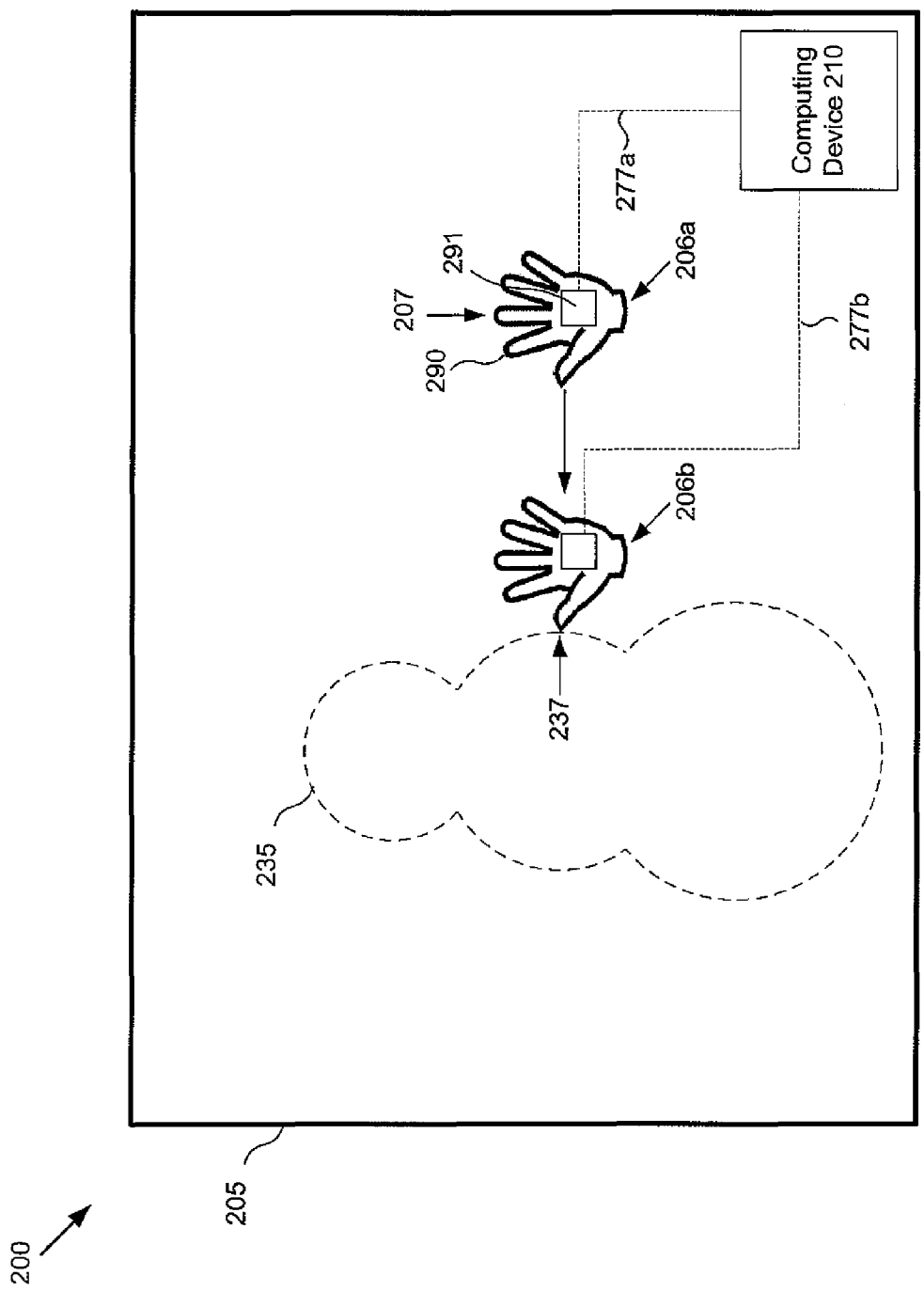
FIG. 2 shows a diagram of an exemplary virtual object for use with the system of FIG. 1.

FIG. 2 shows a diagram of an exemplary virtual object for use with the system of FIG. 1. Diagram 200 shows room 205 including virtual object 235, feedback device 290, and computing device 210 connected to feedback device 290 by connection 277. Feedback device 290 may be worn by a user (not shown), and includes feedback element 291. As shown in FIG. 2, virtual object 235 is a 2D virtual object. When the hand of the user is located in position 206a, computing device 210 may determine that the hand of the user does not intersect the surface of virtual object 235, and the user may experience no sensory feedback, i.e., feedback element 291a is not activated. When the hand of the user moves to position 206b, the hand of the user intersects the virtual surface of virtual object 235 at point 237. Computing device 210 may determine that the hand of the user has intersected the virtual surface of virtual object 235 and transmit an activation signal to activate feedback element 291b to provide the user with sensory feedback.

In some implementations, feedback element 291 may provide a haptic feedback using vibration, tapping, or other physical effect. In other implementations, feedback element 291 may provide auditory feedback using a beep, chime, song, or other sound effect. The user may use the sensory feedback to explore the virtual boundary of virtual object 235 by moving the hand of the user to determine the shape of virtual object 235. For example, a user may be located in room 205 and instructed to determine the identity of virtual object 235. To determine the position of the hand of the user 207 and track the position of the hand of the user 207 as the hand of the user 207 moves around room 205, feedback device 290 may include one or more of an accelerometer, a gyrometer, and/or a magnetometer. When the hand of the user 207 is located in a position in which the hand of the user 207 is does not intersect the virtual boundary of virtual object 235, feedback element 291 may remain inactive. When the hand of the user 207 intersects the virtual boundary of virtual object 235, computing device 210 may activate feedback element 291 communicating to the user that the hand of the user 207 has intersected the virtual boundary of virtual object 235. As the user continues to move the hand of the user 207 in room 205, the user may determine what points include virtual object 235 and what points do not include virtual object 235 based on sensory feedback provided by feedback element 291. In some implementations, feedback element 291 may provide sensory feedback when the hand of the user 207 has crossed the virtual boundary of virtual object 235 but is no longer intersecting the virtual boundary, e.g., when the hand of the user 207 is inside virtual object 235.

Figure 3:
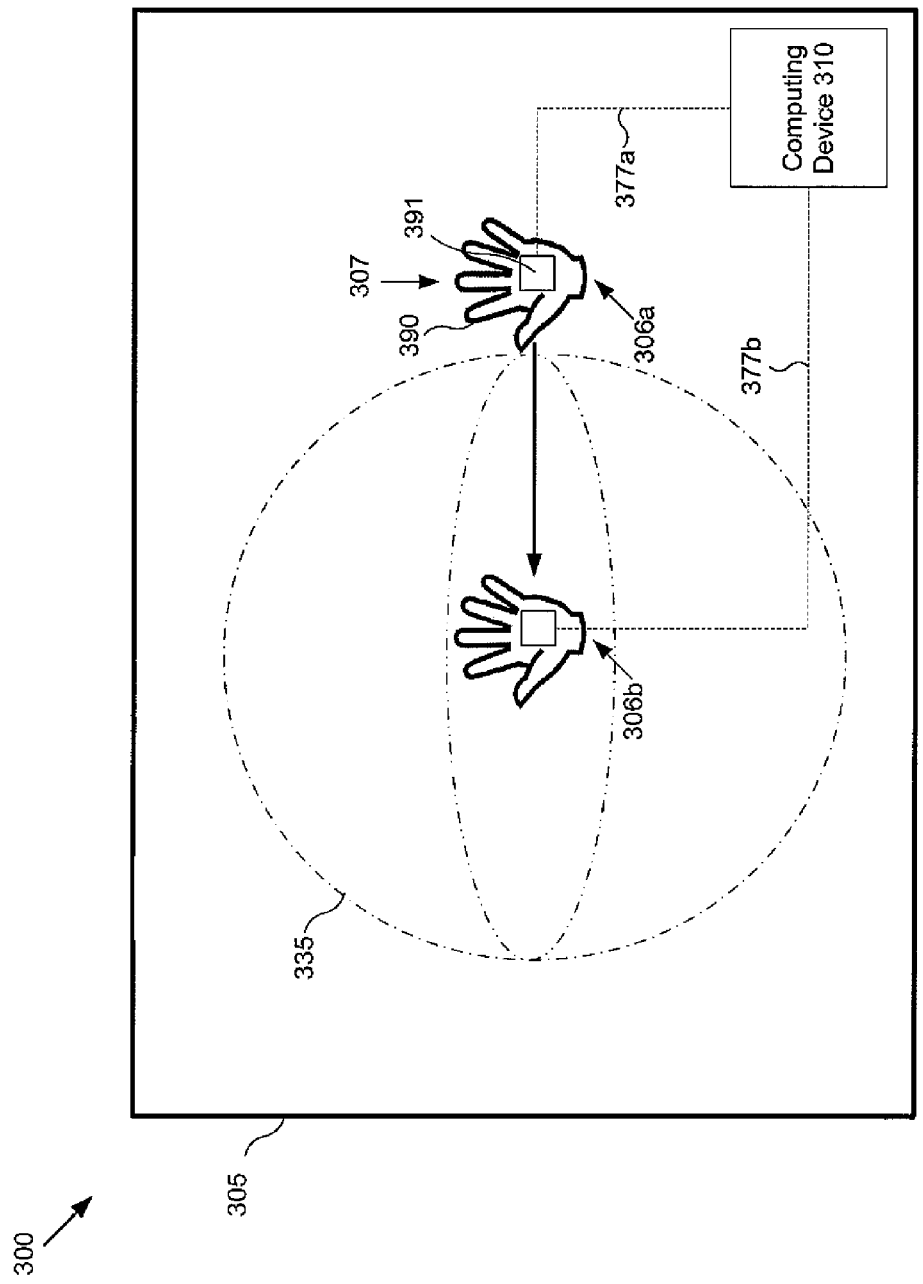
FIG. 3 shows a diagram of another exemplary virtual object for use with the system of FIG. 1.

FIG. 3 shows a diagram of another exemplary virtual object for use with the system of FIG. 1. Diagram 300 shows room 305 including virtual object 335, feedback device 390, and computing device 310 connected to feedback device 390 by connection 377. Feedback device 390 may be worn by a user (not shown). As shown in FIG. 3, virtual object 335 includes a 3D virtual boundary. To track the 3D position of the hand of the user 307 as the hand of the user 307 moves around room 305, feedback device 390 may include one or more of an accelerometer, a gyrometer, and/or a magnetometer, and computing device 310 may include one or more cameras, and infrared depth sensor, LIDAR, or any combination thereof. In some implementations, as the hand of the user 307 moves from position 306a where the hand of the user intersects the virtual surface of virtual object 335 to position 306b inside virtual object 335, computing device 310 may change the sensory feedback provided by feedback element 391. In some implementations, computing device 310 may send an activation signal to feedback element 391 when the hand of the user 307 intersects the virtual surface of virtual object 335, and increase or decrease the intensity of the sensory feedback as the hand of the user 307 moves into and through virtual object 335.

Figure 4:
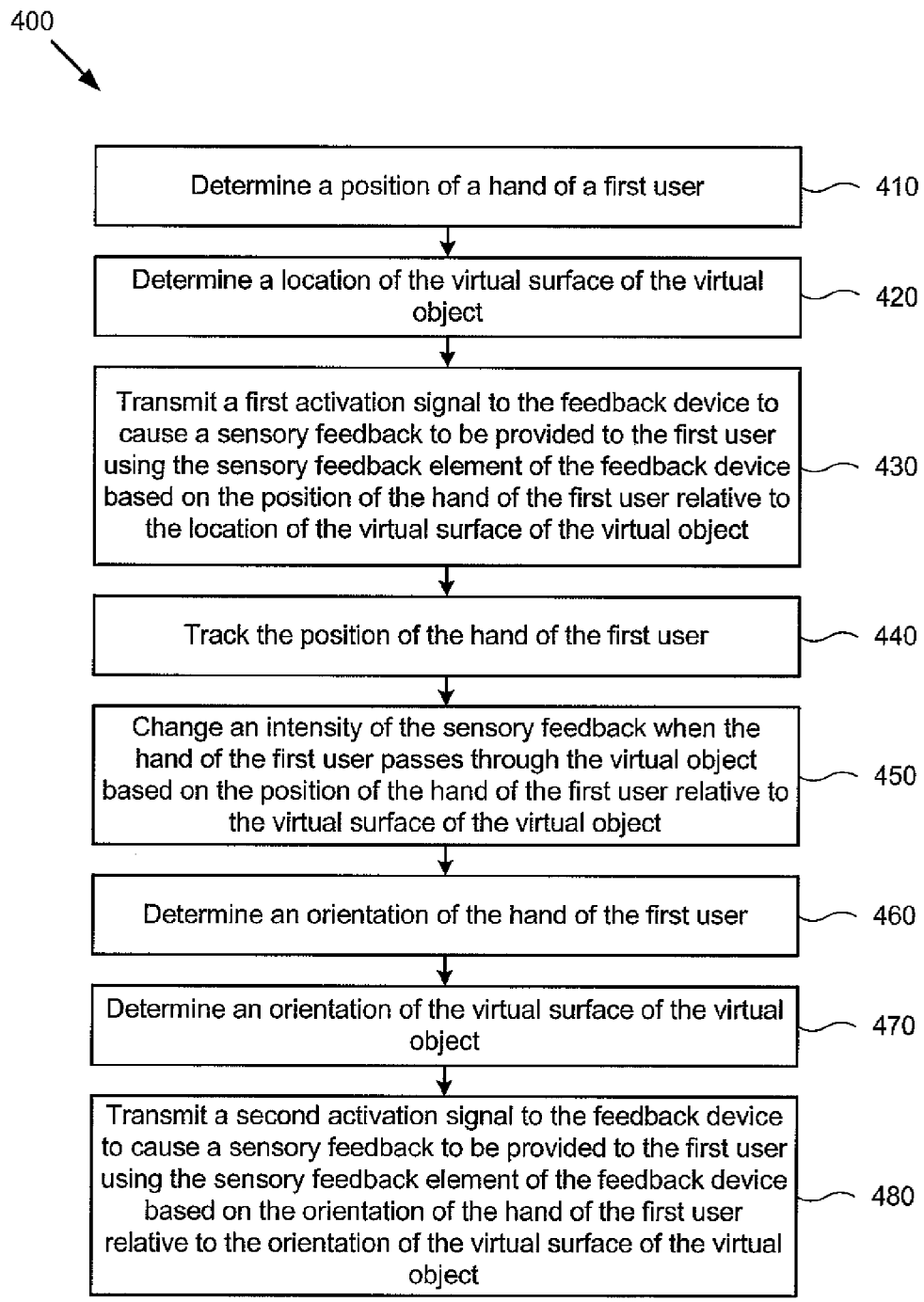
FIG. 4 shows a flowchart illustrating an exemplary method of interacting with virtual objects using sensory feedback, according to one implementation of the present disclosure.

FIG. 4 shows a flowchart illustrating an exemplary method of interacting with virtual objects using sensory feedback, according to one implementation of the present disclosure. Method 400 begins at 410, where executable code 140 determines a position of a hand of a first user. Computing device 110 may determine the position of the hand of the user using one or more of input device 185 and sensor 193. Input device 185 may be a camera, a video camera, an infrared camera, an infrared depth detection device, a LIDAR device, or any combination thereof. In some implementations, input device 185 may include stereo cameras, such as stereo RGB cameras. Determining the position of the hand of the user may include determining the position of the hand of the user relative to computing device 110, relative to feedback device 190, in an area where the user is using system 100, etc.

At 420, executable code 140 determines a location of the virtual surface of virtual object 135. In some implementations, the virtual surface of virtual object 135 may be a 2D surface having a boundary that may include variation in width or height but does not change with depth, e.g., a silhouette, or a 3D surface that may include variations in width, height, and depth, e.g., a sphere. The virtual surface of virtual object 135 may be located at a position relative to computing device 110, relative to feedback device 190, at a position in a room where the user is using system 100, etc.

At 430, executable code 140 transmits a first activation signal to feedback device 190 to cause a sensory feedback to be provided to the first user using sensory feedback element 191 of feedback device 190 based on the position of the hand of the first user relative to the location of the virtual surface of the virtual object. In some implementations, the hand of the user may not intersect the virtual surface of the virtual object and sensory feedback module 145 may not send an activation signal to sensory feedback element 191, or the hand of the user may intersect the virtual surface of virtual object 135 and sensory feedback module 145 may send an activation signal to sensory feedback element 191. The hand of the user may be at a position that does not intersect with the virtual surface of virtual object 135, but is inside virtual object 135. In such a situation, sensory feedback module 145 may send an activation signal to sensory feedback element 191 if virtual object 135 is virtually solid, sensory feedback module 145 may send an activation signal to sensory feedback element 191 if virtual object 135 is virtually hollow because the hand of the user is between virtual surfaces of virtual object 135, or sensory feedback module 145 may not send an activation signal to sensory feedback element 191 if virtual object 135 is virtually hollow.

At 440, executable code 140 tracks the position of the hand of the first user. In some implementations, the hand of the user may move from the original position determined by position module 143. Position module 143 may track the movement of the hand of the user using input device 185, sensor 193, etc. In some implementations, position module 143 may track the position of the hand of the user as it moves in two dimensions, or position module 143 may track the movement of the hand of the user in three dimensions. Method 400 continues at 450, where executable code 140 changes an intensity of the sensory feedback when the hand of the first user passes through the virtual object based on the position of the hand of the first user relative to the virtual surface of the virtual object. In some implementations, executable code 140 may change the intensity of the sensory feedback as the hand of the user approaches the virtual surface of virtual object 135. Fore example, executable code 140 may begin providing a low intensity haptic feedback when the hand of the user is within one inch of the virtual surface of virtual object 135 and increase the intensity of the haptic feedback as the hand of the user approaches the virtual surface of virtual object 135.

At 460, executable code 140 determines an orientation of the hand of the first user, such as whether the hand of the first user is oriented substantially horizontally, substantially vertically, at an angle, etc. In some implementations, position module 143 may determine the orientation of the hand of the user including a relative position of the fingers of the hand of the user, the palm of the hand of the user, the back of the hand of the user, etc. Method 400 continues at 470, where executable code 140 determines an orientation of the virtual surface of the virtual object. In some implementations, the virtual surface of virtual object 135, or a portion thereof, may be substantially horizontal, substantially vertical, at an angle, curved, etc.

At 480, executable code 140 transmits a second activation signal to the feedback device to cause a sensory feedback to be provided to the first user using the sensory feedback element of the feedback device based on the orientation of the hand of the first user relative to the orientation of the virtual surface of the virtual object. In some implementations, feedback device 190 may include a plurality of sensory feedback elements, such as when feedback device 190 is a glove including a sensory feedback element in two or more locations in the glove, e.g., one sensory feedback element in the thumb of the glove and one sensory feedback element in the little finger of the glove, or one sensory feedback element in the middle finger of the glove and one sensory feedback element in the palm of the glove, or one sensory feedback element in each finger of the glove, one sensory feedback element in the thumb of the glove, and one sensory feedback element in the palm of the glove. Sensory feedback module 145 may send an activation signal to one or more of the plurality of sensory feedback elements in the glove indicating when different parts of the hand of the user have intersected the virtual surface of virtual object 135. In this manner, the user may determine the location and orientation of the portion of the virtual surface that the user is virtually touching.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for playing a game, the system comprising:
    a feedback device including a sensory feedback element;
    a non-transitory memory storing an executable code and a virtual object having a virtual surface;
    a hardware processor configured to execute the executable code to:
        determine a position of a hand of a first user when playing the game;
        determine a location of the virtual surface of the virtual object of the game; and
        transmit a first activation signal to the feedback device to cause a sensory feedback to be provided to the first user using the sensory feedback element of the feedback device based on the position of the hand of the first user relative to the location of the virtual surface of the virtual object;
        wherein the first activation signal indicates that the virtual object is virtually hollow when the hand of the first user passes through the virtual surface and is inside the virtual object, and the first activation signal indicates that the virtual object is virtually solid when the hand of the first user cannot pass through the virtual surface to be inside the virtual object, and wherein the virtual object is a virtual representation of an object and is shown on a display.

2. The system of claim 1, wherein the processor further executes the executable code to:
    track the position of the hand of the first user;
    change an intensity of the sensory feedback when the hand of the first user passes through the virtual object based on the position of the hand of the first user relative to the virtual surface of the virtual object.

3. The system of claim 1, wherein the processor further executes the executable code to:
    determine an orientation of the hand of the first user;
    determine an orientation of the virtual surface of the virtual object;

transmit a second activation signal to the feedback device to cause a sensory feedback to be provided to the first user using the sensory feedback element of the feedback device based on the orientation of the hand of the first user relative to the orientation of the virtual surface of the virtual object.

4. The system of claim 1, wherein the sensory feedback includes one of a haptic feedback and an audio feedback.

5. The system of claim 1, wherein the feedback device is one of a wearable feedback device and a handheld feedback device.

6. The system of claim 1, wherein the virtual surface is a three-dimensional surface.

7. The system of claim 1, wherein the display is an augmented reality display.

8. The system of claim 1, wherein the virtual object is a virtual representation of a second user located at a remote location.

9. The system of claim 1, wherein the virtual object is created by a second user.

10. A method for use with a system for playing the game, the system comprising a feedback device, a non-transitory memory, and a hardware processor, the method comprising:
determining, using the hardware processor, a position of a hand of a first user when playing the game;
determining, using the hardware processor, a location of the virtual surface of the virtual object of the game; and
transmitting, using the hardware processor, a first activation signal to the feedback device to cause a sensory feedback to be provided to the first user using the sensory feedback element of the feedback device based on the position of the hand of the first user relative to the location of the virtual surface of the virtual object;
wherein the first activation signal indicates that the virtual object is virtually hollow when the hand of the first user passes through the virtual surface and is inside the virtual object, and the first activation signal indicates that the virtual object is virtually solid when the hand of the first user cannot pass through the virtual surface to be inside the virtual object, and wherein the virtual object is a virtual representation of an object and is shown on a display.

11. The method of claim 10, further comprising:
tracking, using the hardware processor, the position of the hand of the first user
changing, using the hardware processor, an intensity of the sensory feedback when the hand of the first user passes through the virtual object based on the position of the hand of the first user relative to the virtual surface of the virtual object.

12. The method of claim 10, further comprising:
determining, using the hardware processor, an orientation of the hand of the first user;
determining, using the hardware processor, an orientation of the virtual surface of the virtual object;
transmitting, using the hardware processor, a second activation signal to the feedback device to cause a sensory feedback to be provided to the first user using the sensory feedback element of the feedback device based on the orientation of the hand of the first user relative to the orientation of the virtual surface of the virtual object.

13. The method of claim 10, wherein the sensory feedback includes one of a haptic sensory feedback and an audio sensory feedback.

14. The method of claim 10, wherein the feedback device is one of a wearable feedback device and a handheld feedback device.

15. The method of claim 10, wherein the virtual surface is a three-dimensional surface.

16. The method of claim 10, wherein the display is an augmented reality display.

17. The method of claim 10, wherein the virtual object is a virtual representation of a second user located at a remote location.

18. The method of claim 10, wherein the virtual object is created by a second user.

* * * * *